United States Patent
Decraene

(10) Patent No.: US 11,870,687 B2
(45) Date of Patent: Jan. 9, 2024

(54) METHOD AND DEVICE FOR SENDING DATA PACKETS OVER AN IP/MPLS NETWORK

(71) Applicant: ORANGE, Issy-les-Moulineaux (FR)

(72) Inventor: Bruno Decraene, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/967,953

(22) PCT Filed: Jan. 31, 2019

(86) PCT No.: PCT/FR2019/050221
§ 371 (c)(1),
(2) Date: Aug. 6, 2020

(87) PCT Pub. No.: WO2019/155144
PCT Pub. Date: Aug. 15, 2019

(65) Prior Publication Data
US 2021/0176170 A1 Jun. 10, 2021

(30) Foreign Application Priority Data

Feb. 7, 2018 (FR) .................................. 1851037
Feb. 14, 2018 (FR) .................................. 1851251

(51) Int. Cl.
  *H04L 12/46* (2006.01)
  *H04L 12/723* (2013.01)
  *H04L 45/50* (2022.01)

(52) U.S. Cl.
  CPC .......... *H04L 45/50* (2013.01); *H04L 12/4633* (2013.01)

(58) Field of Classification Search
None
See application file for complete search history.

(56) References Cited

U.S. PATENT DOCUMENTS

| 8,570,871 B2 * | 10/2013 | Yong | H04L 45/245 370/235 |
| 8,619,587 B2 * | 12/2013 | Yong | H04L 69/22 370/392 |
| 9,178,810 B1 * | 11/2015 | Singh | H04L 45/50 |
| 9,210,089 B2 * | 12/2015 | Akiya | H04L 45/50 |
| 9,300,579 B2 * | 3/2016 | Frost | H04L 45/74 |
| 9,356,857 B1 * | 5/2016 | Narayanan | H04L 45/302 |

(Continued)

FOREIGN PATENT DOCUMENTS

WO  2016157133 A1  10/2016

OTHER PUBLICATIONS

Rosen et al., "MPLS Label Stack Encoding", RFC3032, Jan. 2001.

(Continued)

*Primary Examiner* — Alpus Hsu
(74) *Attorney, Agent, or Firm* — David D. Brush; Westman, Champlin & Koehler, P.A.

(57) ABSTRACT

A method for sending data packets encapsulated according to the MPLS protocol, and a sending device of an IP/MPLS network configured to implement the method. The sending method includes obtaining an identifier representative of a group of data packets having at least one data packet, inserting the identifier into at least one part of a data field associated with an entropy label of the MPLS protocol of the at least one data packet, and sending the at least one data packet in the IP/MPLS network.

13 Claims, 2 Drawing Sheets

(56) References Cited

U.S. PATENT DOCUMENTS

Figure 5:
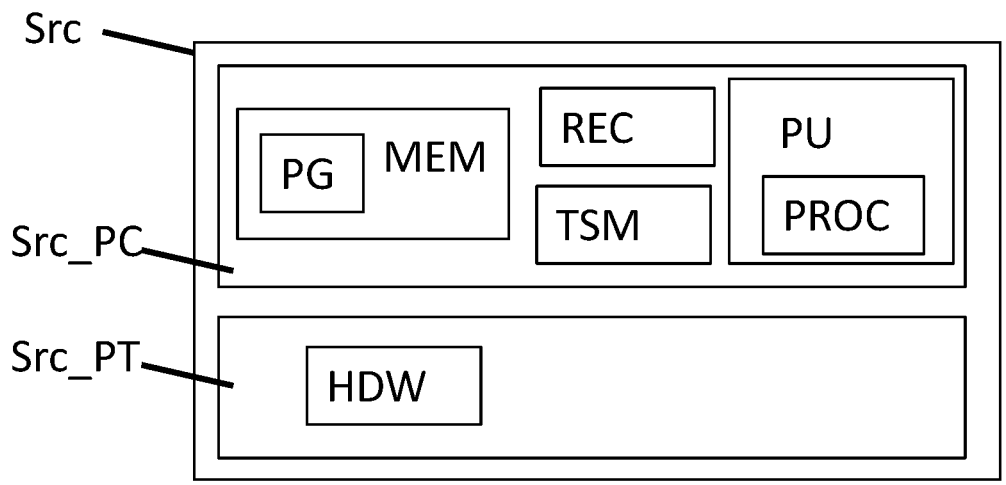

| | | | | |
|---|---|---|---|---|
| 9,438,432 | B2* | 9/2016 | Shepherd | H04L 45/50 |
| 9,461,910 | B2* | 10/2016 | Kini | H04L 45/50 |
| 9,853,890 | B2* | 12/2017 | Gafni | H04L 45/507 |
| 9,912,598 | B2* | 3/2018 | Wu | H04L 45/50 |
| 9,942,136 | B2* | 4/2018 | Xu | H04L 47/825 |
| 10,027,594 | B1* | 7/2018 | Seshadri | H04L 47/115 |
| 10,069,723 | B2* | 9/2018 | Xiao | H04L 45/38 |
| 10,270,691 | B2* | 4/2019 | Nainar | H04L 12/4633 |
| 10,333,853 | B1* | 6/2019 | Seshadri | H04L 5/0064 |
| 10,608,922 | B2* | 3/2020 | Dutta | H04L 61/6004 |
| 2003/0026262 | A1* | 2/2003 | Jarl | H04L 12/5601 370/394 |
| 2015/0030020 | A1 | 1/2015 | Kini et al. | |
| 2015/0200843 | A1 | 7/2015 | Frost et al. | |

OTHER PUBLICATIONS

K. Kompella et al., "The Use of Entropy Labels in MPLS Forwarding", RFC6790, Nov. 2012.

International Search Report and Written Opinion dated Apr. 4, 2019 for corresponding International Application No. PCT/FR2019/050221, filed Jan. 31, 2019.

English translation of the Written Opinion of the International Searching Authority dated Aug. 11, 2020 for corresponding International Application No. PCT/FR2019/050221, filed Jan. 31, 2019.

* cited by examiner

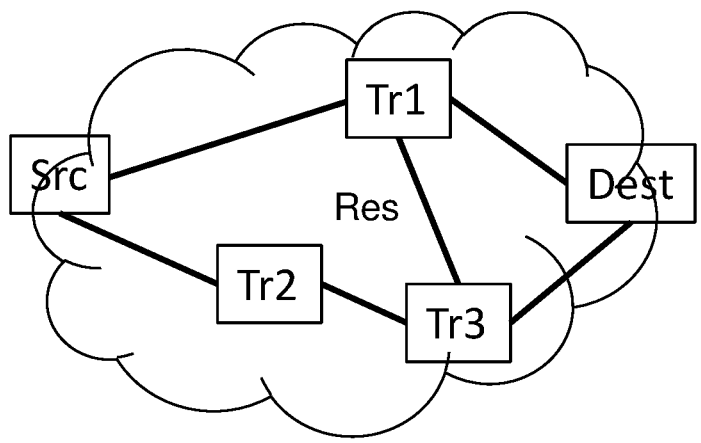
Fig. 1
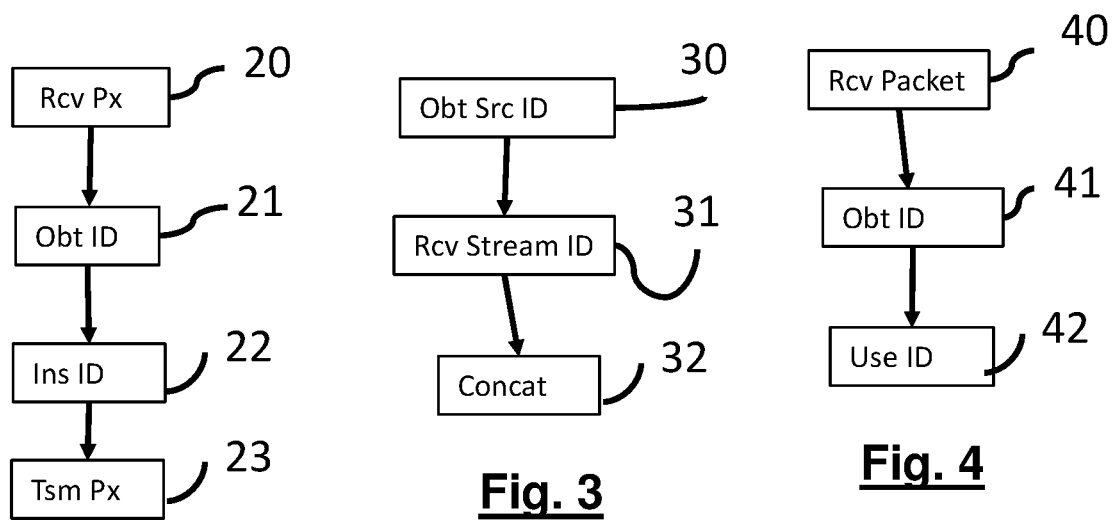
Fig. 2
Fig. 3
Fig. 4

METHOD AND DEVICE FOR SENDING DATA PACKETS OVER AN IP/MPLS NETWORK

CROSS-REFERENCE TO RELATED APPLICATIONS

This Application is a Section 371 National Stage Application of International Application No. PCT/FR2019/050221, filed Jan. 31, 2019, which is incorporated by reference in its entirety and published as WO 2019/155144 A1 on Aug. 15, 2019, not in English.

FIELD OF THE INVENTION

The invention relates to communication networks and more specifically to IP/MPLS (Internet Protocol/Multi Protocol Label Switching) packet networks.

PRIOR ART

An IP/MPLS network is a network of routers routing IP or MPLS packets. The data transport mechanism implemented in such a network is based on the switching of labels or "tags" inserted into the packets at the input to the MPLS network and removed from the packets at the output of the MPLS network. According to this technology, transmission paths for the data packets in the MPLS network are defined between routers in the MPLS network, known as PE (Provider Edge) or LER (Label Edge Router).

At the input to the MPLS network, notably, an input router inserts at least one label into the received data packets, allowing the transmission of said packet across the MPLS network according to the path associated with the label(s). The label or labels inserted into the packet are determined from correspondence tables, associating one or more labels to a class, known as FEC (Forwarding Equivalence Class). The same FEC class is assigned to a group of data packets having at least one common characteristic. The packets associated with the same FEC class will then follow the same transmission path in the MPLS network.

The MPLS transport mechanism thus enables tunnels to be set up, also known as LSP (Label Switched Path). Different types of tunnels can be defined, for example:
- point-to-point, via the RSVP-TE (Reservation Protocol Traffic Engineering) protocol,
- multipoint-to-point, via the LDP (Label Distribution Protocol) protocol or the "Segment Routing" protocol,
- point-to-multipoint, via the RSVP-TE or mLDP protocol,
- multipoint-to-multipoint.

One disadvantage of these mechanisms is that it is not possible for an observer located on the path of a tunnel or at the outgoing end of a tunnel to identify the source of a data stream, or to identify a data stream or a group of data streams, or a packet or a group of packets transmitted on the path.

Such a limitation is problematic, in particular for the quality control of the network, or for monitoring the network performance through measurements of packet loss or transmission delay for example, or for measuring the traffic in the network for statistical or dimensioning purposes, or for measuring the traffic in the network for usage billing purposes, or for ensuring an end-to-end protection of the transmitted streams.

One solution for resolving this problem could be to insert into each received MPLS packet 2 or 3 additional MPLS labels with an identification of the path and an identification of the source of the stream. However, such a solution is not optimal because it requires the update of the routers already in place in the MPLS networks to take into account these new fields. Yet such routers are difficult to modify.

In addition, such a solution requires the use of an MPLS label called reserved, to indicate that the following labels correspond to the source and/or path identification. Such labels called reserved are limited in number in the MPLS standard; only 16 reserved labels have been defined for the whole MPLS standard.

Such a solution also requires the modification of all the destination entities of the received packets, as well as additional signalling in the control plan so that a destination entity announces the support of these new fields to the input router of the tunnel.

Such a solution also requires the addition of additional MPLS labels to the packets, which can be difficult for the router adding them, and will also make it more difficult to read the headers placed behind these labels, especially for load sharing purposes across multiple paths.

There is therefore a need to improve the prior art.

SUMMARY OF THE INVENTION

The invention relates, for this purpose, to a method for sending data packets encapsulated according to the MPLS protocol, implemented by a sending device of an IP/MPLS network. The sending method according to the invention comprises:
- obtaining an identifier representative of a group of data packets comprising at least one data packet,
- inserting said identifier into at least one part of a data field associated with an entropy label of the MPLS protocol of said at least one data packet,
- sending said at least one data packet over the IP/MPLS network.

The method according to the invention thus makes it possible to reuse fields of existing labels of the MPLS standard, avoiding the addition of new MPLS labels in the packets or the use of reserved labels. The invention thus makes it possible to provide a solution for identifying the source or the stream compatible with the routers already in place in an MPLS network. In particular, the functions of the forwarding plan implemented by hardware components of the transit and destination routers are not modified.

Furthermore, according to the invention, the use of an existing label makes it possible not to increase the size of the label stack of the transmitted packets.

The identifier representative of a group of data packets can correspond to an identifier indicating the source having sent the packets of the group of data packets, or to an identifier of the group of packets itself, or to an identifier comprising a part for identifying the source that transmitted the packet and a part for identifying the group of packets itself.

The entropy mechanism was introduced in MPLS networks to add entropy to the network in order to allow load sharing in the MPLS network (i.e. to allow data packets assigned to the same class to follow different paths in the network), while ensuring that all the packets in a given stream follow only one path (to avoid the risk of packets arriving in a different order). To do this, two specific labels, hereafter called entropy labels, are inserted into the data packets. A first label called Entropy Label Indicator label or "ELI label" according to the MPLS protocol whose "Label" field contains a well-known value and which indicates that the next label called Entropy Label or "EL label" according to the MPLS protocol corresponds to the entropy mechanism. The second label "EL label" comprises an entropy value in a "Label" field.

Advantageously, such an "EL label" entropy label can add entropy to the data packets, while respecting the constraint according to which packets belonging to the same data stream are transmitted via the same path, i.e. the same succession of links through the network, in order to avoid packet re-ordering. Hence, for packets in the same data stream, the same entropy value will be used.

Because of their function, the entropy labels are not used for routing the packets in the network, it is understood by this that the entropy labels are not interpreted by the routers in the same way as the labels carrying FEC type information.

Hence, the entropy value carried by an entropy label can be any entropy value, as long as the packets in the same data stream carry the same entropy value. The fields of an entropy label can thus be advantageously used to carry an identifier of the source having sent the data packet and/or of a group of packets, without modifying the operation of the MPLS protocol entropy solution.

Hereafter, the 4-byte header, also known as "label" according to the RFC 6790 standard or "label stack entry" according to the RFC 3032 standard, is called "label". Such a 4-byte header or label comprises a 20-bit coded value in a data field also called "Label". For reasons of clarity, such a 20-bit coded label value will hereafter be referred to as "Label" data field or "Label" field of the label.

According to a particular embodiment of the invention, said data field is comprised in the list comprising:
- a "Label" data field of the "EL label" entropy label,
- a Traffic Class "TC" data field of the "EL label" entropy label,
- a Time To Live "TTL" data field of the "EL label" entropy label,
- a "TC" data field of the "ELI label" entropy label,
- a "TTL" data field of the "ELI label" entropy label.

Advantageously, one or more fields of the MPLS "EL label" entropy label and/or the MPLS "ELI label" entropy label are used to carry the source and/or packet group identifier. Such fields are not used for packet routing, so they can be used in whole or in part for the purposes of the invention, without impacting the operation of the MPLS standard entropy solution.

According to a particular embodiment of the invention, when a stream comprises at least two groups of data packets, a first part of said identifier is inserted into the "Label" data field of the "EL label" entropy label of each of the data packets of the two groups, and a second part of said identifier is inserted into another field of the "EL label" or "ELI label" entropy label of each of the data packets of the two groups, said second part being identical for all the packets of the same group of packets of the stream, and distinct for data packets not belonging to the same group of packets of the stream.

According to this particular embodiment of the invention, it is thus possible to identify groups of packets of the same stream by inserting a distinct identifier for each group of packets, while respecting the entropy mechanism constraint according to which the packets of the same stream follow the same path. Indeed, the first part of the identifier inserted into the "Label" data field of the "EL label" entropy label is identical for all the data packets regardless of the group of packets to which they belong.

According to another particular embodiment of the invention, said identifier is a stream identifier to which said group of packets belongs and said identifier is received by the sending device. According to this particular embodiment of the invention, the stream identifier is determined in a centralised manner and transmitted to the sending device for insertion into the data packets. According to this particular embodiment of the invention, the stream identifier is determined in a centralised manner and transmitted to the sending device for insertion into the data packets.

According to another particular embodiment of the invention, obtaining an identifier comprises:
- obtaining an identifier of said sending device,
- determining by the sending device a stream identifier to which the packet group belongs,
- concatenating said sending device identifier and said stream identifier to form the identifier to be inserted into said at least one packet.

According to this particular embodiment of the invention, the stream identifier is determined locally by the sending device. Thus, there is no need to maintain a central server allocating stream identifiers.

The invention also relates to a device for data packets transmitted on an IP/MPLS network, configured to:
- obtain an identifier representative of a group of data packets comprising at least one data packet,
- insert said identifier into at least one part of a data field associated with an entropy label of the MPLS protocol of said at least one data packet,
- send said at least one data packet in the IP/MPLS network.

The invention also relates to a method for reading an identifier representative of a group of data packets transmitted over an IP/MPLS network, comprising:
- receiving at least one part of a data packet belonging to said group of data packets,
- obtaining said identifier from at least one part of a data field associated with an MPLS entropy label present in said data packet.

Such a method makes it possible to read the packet group identifier inserted by a sending device of the IP/MPLS network. The reading method can advantageously be implemented by an output router of the IP/MPLS network, or a transit router of the IP/MPLS network, or any application server in charge of identifying the groups of packets transmitted on the IP/MPLS network for different uses.

Correlatively, the invention also relates to a device for reading an identifier representative of a group of data packets transmitted over an IP/MPLS network, configured to:
- receive at least one part of a data packet belonging to said group of data packets,
- obtain said identifier from at least one part of a data field associated with an MPLS entropy label present in said data packet.

According to a particular embodiment of the invention, such a reading device is comprised in a transit router of an IP/MPLS network or an output router of an IP/MPLS network.

The invention also relates to a computer program comprising instructions for implementing the methods above according to any one of the particular embodiments described previously, when said program is executed by a processor. The methods can be implemented in various ways, notably in wired form or in software form.

These programs can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means, such as a ROM, for example a CD-ROM or a microelectronic circuit ROM, or a magnetic recording means. Such a storage means can for example be a hard disk, a flash memory, etc. On the other hand, the recording media can correspond to a transmissible medium such as an electrical or optical signal, that can be carried via an electrical or optical cable, by radio or by other means. The programs according to the invention can be downloaded in particular on an Internet-type network. Alternatively, the recording media can correspond to an integrated circuit in which the program is embedded, the circuit being adapted to execute or to be used in the execution of the method in question.

LIST OF FIGURES

Figure 6:
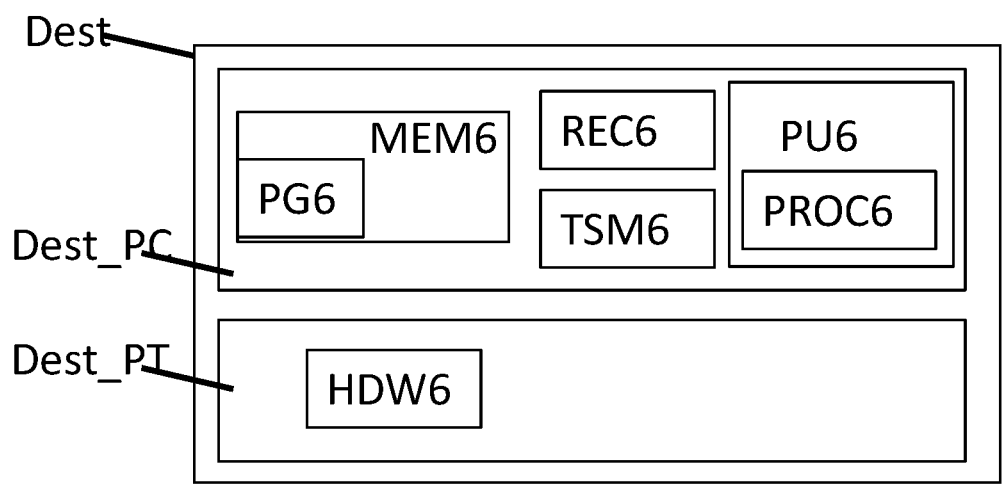

Other characteristics and advantages of the invention will emerge more clearly upon reading the following description of particular embodiments, provided as simple non-restrictive examples, and the annexed drawings, wherein:

FIG. 1 illustrates an example of an IP/MPLS network or a part of an IP/MPLS network in which the invention can be implemented, FIG. 2 illustrates steps of the method for sending a group of MPLS data packets according to a particular embodiment of the invention, FIG. 3 illustrates steps for obtaining an identifier representative of a source and of a stream transmitted by the source according to a particular embodiment of the invention, FIG. 4 illustrates steps of the method for reading an identifier representative of a group of MPLS data packets according to a particular embodiment of the invention, FIG. 5 illustrates a device configured to implement the method for sending a group of MPLS data packets according to a particular embodiment of the invention, FIG. 6 illustrates a device configured to implement the method for reading an identifier representative of a group of MPLS data packets according to a particular embodiment of the invention.

DESCRIPTION OF AN EMBODIMENT OF THE INVENTION 5.1 General Principle of the Invention The general principle of the invention consists in reusing an MPLS header of an entropy label, known as "Entropy Label", already defined in the MPLS standard, in order to carry a source and/or stream identifier transmitted on an MPLS network.

Advantageously, the invention can solve the problem of identifying groups of data packets transiting in the IP/MPLS network without requiring significant modifications of the existing MPLS mechanisms. The use of entropy labels makes it possible both to carry a source, stream or stream packet group identifier and maintain the operation of the entropy mechanism defined by the MPLS standard and used for load sharing in the MPLS network.

5.2 Particular Embodiments of the Invention

As a reminder, the entropy mechanism defined in the document RFC6790 ("The use of Entropy Labels in MPLS Forwarding", IETF, November 2012) consists in adding two specific labels to a data packet transported by an MPLS network. These two labels are inserted just after the label indicating the tunnel destination (LSP). These two labels are illustrated in the table 1 below. A first label called ELI (Entropy Label Indicator) is a reserved MPLS label. It is used to indicate that the following label is a label coding the entropy. This first label is therefore not used for the packet routing.

The second label called EL (Entropy Label) is a label carrying an entropy value. The value coded in this label is any value, outside the values 0-15 which are reserved, but it must be constant for a given stream. Such a value is used to add entropy in order to distribute the different streams better during load sharing across several paths.

TABLE 1

Entropy labels inserted into an MPLS header

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label                  | TC  |S|       TTL     |   (Label ELI)
+-+-+-+-+-+-+-+-+-+-+-+-+-+-+-+-+-+-+-+-+-+-+-+-+-+-+-+-+-+-+-+-+
+-+-+-+-+-+-+-+-+-+-+-+-+-+-+-+-+-+-+-+-+-+-+-+-+-+-+-+-+-+-+-+-+
|                Label                  | TC  |S|       TTL     |   (Label EL)
+-+-+-+-+-+-+-+-+-+-+-+-+-+-+-+-+-+-+-+-+-+-+-+-+-+-+-+-+-+-+-+-+
```

As shown in table 1 above, each ELI and EL entropy label consists of 4 fields: a 20-bit coded "Label" field, a 3-bit coded TC field, a 1-bit coded "S" field and an 8-bit coded TTL field. Some fields in this header defined for the entropy mechanism are under-used.

For example, the "Label" field of the EL label (EL.label) is intended to carry an entropy value making it possible to distinguish between several streams to the same destination, for load sharing reasons. Such a field is globally oversized to carry an entropy value. Indeed, in practice, the 20 bits of this "Label" field are not all used to carry an entropy value. Thus, several bits (e.g. 10) of the "Label" field can be used to identify a stream or a group of streams or the source transmitting these streams.

Advantageously, the bits in this field that would be used to carry a stream or source identifier can also be used at the same time for load sharing. Indeed, the only constraint for the value carried by this field is that the carried value must not change for a given stream.

The TC field of the EL entropy label (EL.TC) is normally used to indicate the traffic class of the data packet. However, the MPLS EL entropy label is never used for forwarding packets, and therefore for determining the forwarding class. This field can therefore be used to transport a stream, stream group or source identifier.

The TTL field of the EL label (EL.TTL) is normally used to limit the number of routers crossed in the network. Yet, the MPLS EL entropy label is never used for forwarding packets. However, the entropy mechanism defined in the document RFC6790 specifies that the field EL.TTL must be set to zero to ensure that this label is never used for forwarding. Although an additional protection against possible bugs is always welcome when it does not cost anything, such a measure does not seem necessary. Such a constraint is also specified for other types of labels which should also not be used outside their scope of use, but in practice this constraint is rarely respected. The field EL.TTL can therefore reasonably be used to carry an identifier or a part of an identifier for a stream, stream group or source.

The TTL field of the ELI label (EL.TTL) is normally used to limit the number of routers crossed in the network. But this field is only checked by the LSP termination router and potentially the previous router. For safety reasons, this field cannot therefore be set to 0 or 1. To prevent potential decrementing, the least significant bit will not be used and will be set to 1. It should be noted that the entropy mechanism defined in the document RFC6790 recommends setting a usual TTL value. But such a value has no real interest and it is still authorised to set any value.

The TC field of the ELI label (EL.TC) is normally used to indicate the traffic class. In the case where the network uses the Penultimate Hop Popping (PHP) mechanism, this field cannot be reused. If the network does not use the PHP mechanism, this field can be reused to carry an identifier or a part of an identifier for a stream, stream group or source.

Thus, an identifier for a source, stream or stream group, packet or packet group can be coded on at least one part of fields of an EL or ELI entropy label.

When the PHP mechanism is used in the network, the number of bits available to code a source, stream or stream group identifier is about 21 bits, taken for example from the following fields: 10 bits from the field EL.label, 3 bits from the field EL.TC, 8 bits from the field EL.TTL and 7 bits from the field ELI.TTL. The number of bits indicated here is a simple illustrative example, other values of the number of bits taken from the above-mentioned fields are naturally possible. For example, 8 or 12 bits can be taken from the field EL.Label.

When the PHP mechanism is not used in the network, the number of bits available to code a source, stream or stream group identifier is about 30 bits, taken for example from the following fields: 10 bits from the field El.label, 3 bits from the field EL.TC, 8 bits from the field EL.TTL, 8 bits from the field ELI.TTL and 8 bits from the field ELI.TC. The number of bits indicated here is a simple illustrative example, other values of the number of bits taken from the above-mentioned fields are naturally possible. For example, 8 or 12 bits can be taken from the field EL.Label.

21 bits allow to encode $2^{21}$=2,087,152 distinct values. Identifying the number of source routers in an MPLS network requires a value per source router. Considering a network of 5,000 MPLS routers, which is already a very large network, 5,000 values are therefore necessary, i.e. 12 bits (4,096 sources) or 13 bits (8,192 sources). This leaves 9 or 8 bits per source router to identify streams, i.e. 512 or 256 streams.

In the case of a centralised stream allocation, all the 21 bits can be used for stream identification, allowing the identification of 2 million different streams.

Moreover, in the case where the PHP mechanism is not used, 9 additional bits are available, which is considerable (30 bits allow to encode 1,073,741,824 different values, i.e. more than one billion). It thus appears that the fields of the entropy labels are sufficient to carry a stream and/or source identifier without requiring the addition of new labels or the modification of the forwarding plans for the routers of an MPLS network.

FIG. 1 illustrates, in a simplified manner, an example of an IP/MPLS network Res or a part of an IP/MPLS network Res comprising an input router (or source) Src, also known as "Ingress LSR" (Ingress Label Switching Router) router, transit routers Tr1-Tr3, also known as transit LSR, and an output or destination router Dest, also known as "egress LSR". Different tunnels for transmitting data packets received by the input router Src are defined in this network Res.

FIG. 2 illustrates steps of the method for sending a group of data packets over an IP/MPLS network, for example, the network Res of FIG. 1, according to a particular embodiment of the invention.

According to the particular embodiment of the invention described here, the sending method is implemented by a routing device placed at the input to an MPLS network, for example, the router Src of FIG. 1. In other embodiment variants, the sending method can be implemented by a transit router of the IP/MPLS network.

An embodiment variant is described below according to which an identifier of the source sending data packets in the MPLS network is inserted. Such a source identifier is representative of a group of packets in the sense of the invention. Indeed, the source identifier will then be carried by all the packets transmitted by this source.

In a step 20, the input router Src receives a data packet Px from a stream F to be transmitted. Classically, the input router Src encapsulates the packet Px according to the MPLS protocol by adding, to the packet Px, MPLS labels obtained from the correspondence tables stored in memory and defined by the MPLS network operator, or exchanged by the routing and signalling protocols, to transmit the data packets of the stream F on the corresponding path.

In a step 21, the input router Src obtains its source identifier. Classically, the router Src is identified with a unique identifier, generally a short identifier.

In networks known as Segment Routing, such a source identifier can correspond to the segment identifier (SID, Segment IDentification) of the input router. Such an identifier has the form of an index or a label provisioned in the router and already precisely plays the role of source identifier. In a step 22, in the case where the data packet PX already comprises MPLS EL and ELI entropy labels, the router Src can choose to insert its source identifier into a field or a part of a field of the entropy labels, as described above. Alternatively, the router Src can choose to add another pair of entropy labels as described above.

The fields or part of fields of the entropy labels used to carry an identifier can either be defined by the operator of the MPLS network, or be fixed by the MLPS standard if the standardisation body has defined the fields of the entropy labels to be used to carry the identifier, either fixed or constrained by the implementation used depending on the type of router for example and the hardware and software characteristics of the routers.

When the use of the fields is not fixed, the fields to be used can be chosen depending on the preference of the operator, the number of different sources, and thus the number of bits needed to code the source identifier, the capacity/limitations of the operator's equipment, the use or not of the PHP mechanism in the network, etc.

For example, the source identifier is 8-bit encoded and is inserted into the "Label" field of the EL label.

In the case where the data packet PX does not include MPLS EL and ELI entropy labels, in step 22, the router Src inserts an ELI label and an EL label, and at least one part of a field of one of these two labels comprises the source identifier.

For example, as previously, the source identifier is 8-bit coded and is inserted into the "Label" field of the EL label.

According to another embodiment, for example, when the PHP mechanism is not used in the IP/MPLS network, the 8-bit coded source identifier is inserted into the "TLL" field of the ELI label. Other locations for inserting the identifier are possible and any part of the fields of the labels EL and ELI described above can be used.

In a step 23, the router Src transmits the packet Px thus modified via the MPLS network to its destination.

Another embodiment variant is described below, according to which a stream identifier is inserted into the data packets. Such a stream identifier is representative of a group of packets in the sense of the invention. Indeed, the stream identifier will then be carried by all the data packets belonging to the stream.

In this variant, a stream identifier is allocated in a centralised way, for example, by a central server managing all the transmitted streams.

In step 21, the stream identifier is then distributed to the router Src in a standard way, for example by configuration (for example according to the CLI, NETCONF/YANG protocols) or via the PCEP or BGP (Border Gateway Protocol) protocols.

In step 22, if the data packets of the stream already comprise MPLS EL and ELI entropy labels, the router Src can insert the stream identifier received in step 21 into the packets of this stream. To do this, the router Src inserts the stream identifier into the fields of the MPLS EL and ELI entropy labels, chosen by the operator or defined by the standard, preferably without changing the value of the existing entropy label. Alternatively, the router Src can add a new pair of entropy labels (ELI, EL) and insert the identifier into it.

For example, the stream identifier is 3-bit coded and is inserted into the "IC" field of the EL label. Other locations for inserting the identifier are possible and any part of the fields of the labels EL and ELI described above can be used.

In the case where the data packets do not comprise MPLS EL and ELI entropy labels, in step 22, the router Src inserts an ELI label and an EL label, and the stream identifier into at least one part of a field of one of these two labels.

Another embodiment variant is described below, according to which a stream identifier and a source identifier are inserted into the data packets. According to this variant, it is assumed that the stream is identified in a decentralised way.

FIG. 3 illustrates steps for obtaining the identifier to be inserted into the data packets of the stream F.

In a step 30, as with the first variant, the router Src obtains its source identifier. It is identified with a unique identifier, generally short, for example a 10-bit coded identifier if the MPLS network to which it belongs includes less than 1,000 source routers.

In a step 31, the router Src receives a stream identifier for the stream F to be transmitted. As the stream is identified in a decentralised way, the router Src freely chooses, i.e. locally, a stream identifier, short if possible. For example, the router Src selects an 8-bit coded identifier, if this source router only needs to identify a maximum of 256 streams.

In step 32, the router Src concatenates its source identifier and the stream identifier determined in step 31 to form an 18-bit source+stream identifier.

Then, in step 22, if the data packets of the stream already comprise MPLS EL and ELI entropy labels, the router Src can insert the source+stream identifier obtained into the appropriate fields of the entropy labels. Alternatively, the router Src can choose to add a new pair of entropy labels (ELI, EL), in addition to the entropy labels already present. The router Src then inserts its source+stream identifier into the fields of the new pair of entropy labels (ELI, EL).

For example, the 10 bits of source identifiers are inserted into the "Label" field of the EL label and the 8 bits of stream identifiers are inserted into the "TLL" field of the EL label.

If the data packets of the stream do not comprise MPLS EL and ELI entropy labels, in step 22, the router Src inserts one ELI label and one EL label into each data packet of the stream, and into at least one part of a field of one of these two labels the source+stream identifier.

Another embodiment variant is described below, according to which a stream packet group identifier is inserted into the data packets. This embodiment variant thus makes it possible to identify distinct groups of data packets belonging to the same data stream. According to this variant, the stream identifier is identified in a centralised manner and the packet group identifier is determined in a local manner by the router Src.

In step 21, the stream identifier is obtained by the router Src in a standard manner, for example by configuration (for example according to the CLI, NETCONF/YANG protocols) or via the PCEP protocol, for example such a stream identifier is 10-bit coded. In step 21, the router Src also determines a group identifier for each group of data packets of the stream. For example, such a group identifier is 8-bit coded.

The group identifier is identical for all the data packets belonging to the same group of data packets. And the group identifier is distinct from one group to another to distinguish between the groups of packets.

In step 22, if the data packets of the stream already comprise MPLS EL and ELI entropy labels, then the router Src inserts the stream identifier received in step 21 into the "Label" field of the "EL" entropy label, and the group identifier in another field of the EL or ELI entropy label.

For example, the group identifier is inserted into the "TLL" field of the EL entropy label. Alternatively, the router Src can choose to add a new pair of entropy labels (ELI, EL), in addition to the entropy labels already present. The router Src then inserts the stream identifier and the group identifier into the fields of the new pair of entropy labels (ELI, EL), as mentioned above.

In the case where the data packets of the stream do not comprise MPLS EL and ELI entropy labels, in step 22, the router Src inserts an ELI label and an EL label, and the stream identifier being inserted into the "Label" field of the "EL" entropy label, and the group identifier in another field of the EL or ELI entropy label.

According to this embodiment variant, groups of packets in the same stream can be identified via distinct group identifiers while allowing all the groups of packets to be routed via the same path, thanks to the stream identifier comprised in the "Label" field of the "EL" entropy label, which is identical for all the packets of the stream.

FIG. 4 illustrates steps of the method for reading an identifier representative of a group of data packets transmitted on an IP/MPLS network according to a particular embodiment of the invention. Such a method is implemented for example by a routing device placed at the output of an IP/MPLS network, for example the router Dest in FIG. 1, or by a transit router placed in the IP/MPLS network, for example one of the routers Tr1, Tr2 or Tr3 in FIG. 1, or by an application server (not shown).

In step 40, a data packet encapsulated according to the IP/MPLS protocol is normally received by the routing device. When the method is implemented by an application server, in step 40, the server receives, for example, only a part of the data packet notably comprising the header of the data packet notably comprising the MPLS labels.

In a step 41, the routing device or the application server obtains an identifier from at least one part of a data field associated with an entropy label present in the data packet received. Such an identifier has been inserted according to any one of the variants of the sending method described in relation to FIG. 2 or 3. The identifier is thus obtained from the fields or the part of the fields of the entropy labels into which the router Src inserted the identifier.

Depending on the embodiment variant used, the identifier obtained can correspond to an identifier of the source that transmitted the data packet, or to an identifier of the group to which the packet belongs, or to an identifier of the stream to which the packet belongs, or to an identifier comprising a part representative of the source and a part representative of the stream. Depending on the embodiment variant, a stream identifier and a packet group identifier can be obtained from the fields of the entropy labels.

In a step 42, the routing device or the application server that obtained the identifier can then use it for example to measure the quality of the network, the packet loss rate, the number of packets, the delays between packets, etc.

FIG. 5 shows the simplified structure of a device Src adapted to implement the method for sending an MPLS data packet according to any one of the particular embodiments of the invention described above.

According to a particular embodiment of the invention, the device Src notably comprises a control module Src_PC configured to implement the control plan functions and a forwarding module Src_PT configured to implement the forwarding plan functions. Classically, the forwarding module Src_PT consists of a processor HDW configured to receive and transmit data packets from and to a data network, on instructions from the control module Src_PC.

The control module Src_PC has the standard architecture of a computer and notably comprises a memory MEM, a processing unit PU, equipped for example with a processor PROC, and driven by the computer program PG stored in the memory MEM. The computer program PG can notably comprise instructions for implementing the control plan functions, such as the routing protocols, based on routing tables stored in the memory MEM, for example. Alternatively, the routing protocols can be implemented by one or more interface cards (not shown) of the device Src. According to a particular embodiment of the invention, the device Src is configured to encapsulate the data packets received according to the MPLS protocol.

The device Src also comprises a receiver (REC) and a transmitter (TSM) adapted to receive and transmit data packets.

According to the invention, the computer program PG stored in the memory of the device Src also comprises instructions for implementing the steps of the method for sending a group of MPLS data packets as described above, when the program is executed by the processor PROC.

At initialisation, the code instructions of the computer program PG are for example loaded into a memory before being executed by the processor PROC. The processor PROC of the processing unit PU notably implements the steps of the method for sending an MPLS data packet according to any one of the particular embodiments described in relation to FIG. 2 or 3, according to the instructions of the computer program PG stored in the memory MEM.

According to a particular embodiment of the invention, the device Src is comprised in an input router of an MPLS network.

FIG. 6 shows the simplified structure of a device Dest adapted to implement the method for reading an identifier representative of a group of MPLS data packets according to any one of the particular embodiments of the invention described above.

According to a particular embodiment of the invention, the device Dest notably comprises a control module Dest_PC configured to implement the control plan functions and a forwarding module Dest_PT configured to implement the forwarding plan functions. Classically, the forwarding module Dest_PT consists of a processor HDW6 configured to receive and transmit data packets from and to a data network, on instructions from the control module Dest_PC.

The control module Dest_PC has the standard architecture of a computer and notably comprises a memory MEM6, a processing unit PU6, equipped for example with a processor PROC6, and driven by the computer program PG6 stored in the memory MEM6.

According to a particular embodiment of the invention, the device Dest also comprises a receiver (REC6) and possibly a transmitter (TSM6) adapted to respectively receive and retransmit data packets encapsulated according to the MPLS protocol.

According to another particular embodiment of the invention, the device Dest is an application server configured to receive and read at least one part of an MPLS data packet.

According to the invention, the computer program PG6 stored in the memory of the device Dest also comprises instructions for implementing the steps of the reading method as described above, when the program is executed by the processor PROC6.

At initialisation, the code instructions of the computer program PG6 are for example loaded into a memory before being executed by the processor PROC6. The processor PROC6 of the processing unit PU6 notably implements the steps of the method for receiving an MPLS data packet according to any one of the particular embodiments described in relation to FIG. 4, according to the instructions of the computer program PG6 stored in the memory MEM6.

The device Dest is also configured to use the identifier obtained from a received packet according to a configuration determined by the MPLS network operator.

According to a particular embodiment of the invention, the device Dest is comprised in an output router of an MPLS network.

According to another particular embodiment of the invention, the device Dest is comprised in an input router of an MPLS network.

The invention claimed is:

1. A method for sending data packets encapsulated according to Multi-Protocol Label Switching (MPLS) protocol, implemented by a sending device of an Internet Protocol (IP)/MPLS network, the method being executed by the sending device and comprising:
   obtaining an identifier representative of a group of data packets comprising at least one data packet,
   inserting said identifier into at least a first part of a data field associated with an Entropy Label (EL) label or with an Entropy Label Indicator (ELI) label of the MPLS protocol of said at least one data packet, at least a second part of said data field being associated with an Entropy Label (EL) label and comprising a value of an entropy, wherein said data field is comprised in a list consisting of:
- a Label data field of the EL label,
- a Traffic Class (TC) data field of the EL label,
- a Time To Live (TTL) data field of the EL label,
- a TC data field of the ELI label, and
- a TTL data field of the ELI label, and sending said at least one data packet to a reading device of the IP/MPLS network.

2. The method according to claim 1, wherein the sending comprises sending a stream of data packets that comprises at least two groups of data packets, wherein a first part of said identifier is inserted into the Label data field of the EL label entropy label of each of the data packets of the two groups, and a second part of said identifier is inserted into another field of the EL label or ELI label entropy label of each of the data packets of the two groups, said second part being identical for all the packets of the same group of packets of the stream, and distinct for the data packets not belonging to the same group of packets of the stream.

3. The method according to claim 1, wherein said identifier is a stream identifier to which said group of packets belongs and said identifier is received by a routing device.

4. The method according to claim 1, wherein obtaining the identifier representative of the group of data packets comprises:
- obtaining an identifier of said sending device,
- determining by the sending device a stream identifier to which the packet group belongs,
- concatenating the identifier of said sending device and said stream identifier to form the identifier representative of the group of data packets to be inserted into said at least one packet.

5. A sending device for sending data packets transmitted on an Internet Protocol (IP)/Multi-Protocol Label Switching (MPLS) network, the sending device comprising:
- a receiver,
- a transmitter, a processor, and
- a memory coupled to the processor with instructions to be executed by the processor to:
  - obtain an identifier representative of a group of data packets comprising at least one data packet,
  - insert said identifier into at least a first part of a data field associated with an Entropy Label (EL) label or with an Entropy Label Indicator (ELI) label of the MPLS protocol of said at least one data packet, at least a second part of said data field being associated with an Entropy Label (EL) label and comprising a value of an entropy, wherein said data field is comprised in a list consisting of:
- a Label data field of the EL label,
- a Traffic Class (TC) data field of the EL label,
- a Time To Live (TTL) data field of the EL label,
- a TC data field of the ELI label, and
- a TTL data field of the ELI label, and send said at least one data packet to a reading device of the IP/MPLS network.

6. The device according to claim 5, wherein the device is implemented in a router of the IP/MPLS network.

7. A method for reading an identifier representative of a group of data packets transmitted on an Internet Protocol (IP)/Multi-Protocol Label Switching (MPLS) network, the method being implemented by a reading device of the IP/MPLS network and comprising:

receiving at least one data packet belonging to said group of data packets, and obtaining said identifier from at least a first data field associated with an Entropy Label (EL) label or with an Entropy Label Indicator (ELI) label of an MPLS protocol present in said data packet, at least a second part of said data field being associated with an Entropy Label (EL) label and comprising a value of an entropy, wherein said at least one data field is comprised in a list consisting of:
- a Label data field of the EL label,
- a Traffic Class (TC) data field of the EL label,
- a Time To Live (TTL) data field of the EL label,
- a TC data field of the ELI label, and
- a TTL data field of the ELI label.

8. A device for reading an identifier representative of a group of data packets transmitted on an Internet Protocol (IP)/Multi-Protocol Label Switching (MPLS) network, the device comprising:
- a receiver,
- a processor, and
- a memory coupled to the processor with instructions to be executed by the processor to:
  - receive at least one data packet belonging to said group of data packets, and
  - obtain said identifier from at least a first data field associated with an Entropy Label (EL) label or with an Entropy Label Indicator (ELI) label of an MPLS protocol present in said data packet, at least a second part of said data field being associated with an Entropy Label (EL) label and comprising a value of an entropy, wherein said at least one data field is comprised in a list consisting of:
- a Label data field of the EL label,
- a Traffic Class (TC) data field of the EL label,
- a Time To Live (TTL) data field of the EL label,
- a TC data field of the ELI label, and
- a TTL data field of the ELI label.

9. The device according to claim 8, wherein the device is implemented in a transit router of the IP/MPLS network.

10. The device according to claim 8, wherein the device is implemented in an output router of the IP/MPLS network.

11. A non-transitory computer-readable data medium comprising instructions stored thereon for implementing a method for sending data packets encapsulated according to the Multi-Protocol Label Switching (MPLS) protocol, when the instructions are executed by a processor of a sending device of an Internet Protocol (IP)/MPLS network, wherein the instructions configure the sending device to:

obtain an identifier representative of a group of data packets comprising at least one data packet, insert said identifier into at least a first part of a data field associated with an Entropy Label (EL) label or with an Entropy Label Indicator (ELI) label of the MPLS protocol of said at least one data packet, at least a second part of said data field being associated with an Entropy Label (EL) label and comprising a value of an entropy, wherein said data field is comprised in a list consisting of:
- a Label data field of the EL label,
- a Traffic Class (TC) data field of the EL label,
- a Time To Live (TTL) data field of the EL label,
- a TC data field of the ELI label, and
- a TTL data field of the ELI label, and send said at least one data packet to a reading device of the IP/MPLS network.

12. A non-transitory computer-readable data medium comprising instructions stored thereon for implementing a method for reading an identifier representative of a group of data packets transmitted on an Internet Protocol (IP)/Multi-Protocol Label Switching (MPLS) network, when the instructions are executed by a processor of a reading device of the IP/MPLS network, wherein the instructions configure the reading device to:
- read an identifier representative of a group of data packets transmitted on an Internet Protocol (IP)/Multi-Protocol Label Switching (MPLS) network, comprising:
- receive at least one data packet belonging to said group of data packets, and
- obtain said identifier from at least a first data field associated with an Entropy Label (EL) label or with an Entropy Label Indicator (ELI) label of an MPLS protocol present in said data packet, at least a second part of said data field being associated with an Entropy Label (EL) label and comprising a value of an entropy,
- wherein said at least one data field is comprised in a list consisting of:
  - a Label data field of the EL label,
  - a Traffic Class (TC) data field of the EL label,
  - a Time To Live (TTL) data field of the EL label,
  - a TC data field of the ELI label, and
  - a TTL data field of the ELI label.

13. A method for sending data packets encapsulated according to Multi-Protocol Label Switching (MPLS) protocol, implemented by a sending device of an Internet Protocol (IP)/MPLS network, the method being executed by the sending device and comprising:
- obtaining an identifier representative of a group of data packets comprising at least one data packet,
- inserting said identifier into at least a first part of a data field associated with an Entropy Label (EL) label or with an Entropy Label Indicator (ELI) label of the MPLS protocol of said at least one data packet, at least a second part of said data field being associated with an Entropy Label (EL) label and comprising a value of an entropy, and
- sending said at least one data packet to a reading device of the IP/MPLS network.

* * * * *